US011904822B2

(12) United States Patent
Crippa et al.

(10) Patent No.: US 11,904,822 B2
(45) Date of Patent: Feb. 20, 2024

(54) DISC BRAKE CALIPER BODY

(71) Applicant: FRENI BREMBO S.P.A., Curno (IT)

(72) Inventors: Cristian Crippa, Curno (IT); Mirko Castellana, Curno (IT); Sara Arragoni, Curno (IT); Andrea Pirino, Curno (IT)

(73) Assignee: Brembo S.p.A., Bergamo (IT)

( * ) Notice: Subject to any disclaimer, the term of this patent is extended or adjusted under 35 U.S.C. 154(b) by 472 days.

(21) Appl. No.: 17/253,440

(22) PCT Filed: May 14, 2019

(86) PCT No.: PCT/IB2019/053978
§ 371 (c)(1),
(2) Date: Dec. 17, 2020

(87) PCT Pub. No.: WO2019/243912
PCT Pub. Date: Dec. 26, 2019

(65) Prior Publication Data
US 2021/0276524 A1 Sep. 9, 2021

(30) Foreign Application Priority Data
Jun. 22, 2018 (IT) .......................... 102018000006577

(51) Int. Cl.
*F16D 55/00* (2006.01)
*B60T 13/74* (2006.01)
(Continued)

(52) U.S. Cl.
CPC ............ *B60T 13/741* (2013.01); *B60T 1/065* (2013.01); *F16D 55/226* (2013.01);
(Continued)

(58) Field of Classification Search
CPC ...... F16D 55/224; F16D 55/226; F16D 65/18; F16D 65/183; F16D 65/0056;
(Continued)

(56) References Cited

U.S. PATENT DOCUMENTS 4,726,451 A 2/1988 Giorgetti
5,036,932 A * 8/1991 Schonenberger ..... F16D 55/226
188/73.37

(Continued)

FOREIGN PATENT DOCUMENTS

DE 19701398 A1 * 7/1998 ........... F16D 55/224
EP 3470700 A1 4/2019
(Continued)

OTHER PUBLICATIONS

English Abstract for DE 19701398 (no date).*
(Continued)

*Primary Examiner* — Nicholas J Lane
(74) *Attorney, Agent, or Firm* — Marshall & Melhorn, LLC

(57) ABSTRACT

A caliper body having first and second braking surfaces, a bracket connecting to a caliper support provided in a vehicle and a floating element supported by the bracket to move along the axial direction. The floating element has a first floating element portion facing the first braking surface. The first floating element portion has a biasing device housing to accommodate a biasing device. The floating element has a first floating element bridge protruding straddling the brake disc and a plate-shaped portion extending on a plane along circumferential and radial directions. The plate-shaped portion has end portions protruding from opposite sides with respect to the first floating element bridge, a second inner plate-shape portion side facing the biasing device, two plate-shaped portion projections protruding from the plate-shaped portion side and having thrust surfaces biasing a second pad against the second braking surface and forming with the plate-shaped portion a ventilation channel.

17 Claims, 10 Drawing Sheets

(51) Int. Cl.
  B60T 1/06 (2006.01)
  F16D 55/226 (2006.01)
  F16D 65/00 (2006.01)
  F16D 65/18 (2006.01)
  F16D 121/26 (2012.01)

(52) U.S. Cl.
  CPC ..... F16D 65/0056 (2013.01); F16D 65/0075 (2013.01); F16D 65/18 (2013.01); *F16D 2055/002* (2013.01); *F16D 2055/0016* (2013.01); *F16D 2121/26* (2013.01)

(58) Field of Classification Search
  CPC ............. F16D 65/0075; F16D 65/0068; F16D 65/847; B60T 1/065
  See application file for complete search history.

(56) References Cited

U.S. PATENT DOCUMENTS

| | | | |
|---|---|---|---|
| 5,167,303 A * | 12/1992 | Kobayashi | F16D 55/227 188/71.1 |
| 5,535,856 A | 7/1996 | McCormick et al. | |
| 6,131,706 A | 10/2000 | Gotti et al. | |
| 6,257,378 B1 * | 7/2001 | Girkin | F16D 55/227 188/73.31 |
| 6,272,914 B1 | 8/2001 | Ciotti | |
| 7,234,568 B2 | 6/2007 | Schorn et al. | |
| 8,151,951 B2 | 4/2012 | Cornolti et al. | |
| 9,951,832 B2 | 4/2018 | Crippa et al. | |
| 2016/0273602 A1 * | 9/2016 | Poertzgen | B60T 13/741 |
| 2017/0356513 A1 | 12/2017 | Gualandris et al. | |
| 2018/0328428 A1 * | 11/2018 | Ryu | F16D 65/0972 |
| 2019/0136922 A1 | 5/2019 | Crippa et al. | |

FOREIGN PATENT DOCUMENTS

| | | |
|---|---|---|
| FR | 3031153 A1 | 7/2016 |
| WO | WO 2006/035464 A1 | 4/2006 |
| WO | WO 2012/156849 A1 | 11/2012 |
| WO | WO 2015/098780 A1 | 7/2015 |
| WO | WO 2017/182961 A1 | 10/2017 |
| WO | WO 2017/200012 A1 | 11/2017 |
| WO | WO 2017/212668 A1 | 12/2017 |

OTHER PUBLICATIONS

European Patent Office, International Search Report with Written Opinion, issued in PCT/IB2019/053978, dated Jun. 14, 2019, 11 pages, European Patent Office, Rijswijk, Netherlands.

* cited by examiner

DISC BRAKE CALIPER BODY

CROSS-REFERENCE TO RELATED APPLICATIONS

This application is a National Phase Application of PCT International Application No. PCT/IB2019/053978, having an International Filing Date of May 14, 2019 which claims priority to Italian Application No. 102018000006577 filed Jun. 22, 2018, each of which is hereby incorporated by reference in its entirety.

FIELD OF THE INVENTION

In its most general aspect, the present invention relates to a caliper body for a disc brake, e.g. for a motor vehicle, and to a disc brake caliper which comprises such a body.

Furthermore, the present invention relates to a caliper body of the floating type comprising a bracket adapted to connect to a caliper support provided on the vehicle, as well as a floating element, provided with a biasing device of a first pad, and slidably supported by said bracket so as to move relatively to the bracket reaching an opposite pad to apply a braking action upon activation of said biasing device.

In particular, in a disc brake, the floating element is arranged straddling the outer peripheral margin of a brake disc. The floating element usually comprises a body having two elements which are arranged so as to face opposite braking surfaces of a disc. Clutch pads are provided arranged between each element of the caliper body and the braking surfaces of the brake disc. One of the elements of the body of the floating element has cylinders adapted to accommodate pistons, in some cases hydraulic, but also electrically actuated, capable of applying a thrust action on a pad abutting it against the first braking surface of the disc and slidably moving the floating element to abut the opposite pad against the second opposite braking surface of the disc and to apply a braking action on the vehicle.

BACKGROUND ART

Brake calipers are usually constrained to a supporting structure which remains stationary to the vehicle, such as, for example, a spindle of a vehicle suspension.

In a typical arrangement, one of the two elongated elements has two or more attachment portions of the body of the caliper to the supporting structure, e.g. providing slots or eyelets, e.g. arranged axially, or holes, e.g. arranged radially, adapted to receive screws for fixing the caliper which, with their ends are received in threaded holes provided on the caliper support.

A caliper body of this type is described in US2017356513 by Freni Brembo SPA.

The caliper consists of several different components mounted on the body, such as pistons, seals, bleed devices and brake fluid feeding pipes.

Typically, the caliper body is made of metal, such as aluminum or aluminum alloy or cast iron. The body of the caliper can be obtained by casting, but also by mechanical stock removal machining, as well as forging.

Desiring to stop or decelerate the vehicle, the driver applies a force on the brake pedal, in the case of a motor vehicle. Such force on the brake pedal applies, through a brake master cylinder, a brake fluid pressure which through a pipe is applied to the brake fluid present in the hydraulic circuit placed inside the caliper body to reach the cylinders where the pressure is applied onto the bottom surface of the pistons, whereby forcing them to be close against the pads, which in turn abut against the braking surfaces of the disc.

The pressure action of the brake fluid is also applied on the bottom wall of the cylinder, whereby determining a reaction in the body of the caliper which moves it away from the disc surfaces, whereby biasing the opposite portion of the floating element to abut against the opposite braking surface, biasing and deforming the floating element of the caliper body.

The caliper body must therefore have sufficient structural rigidity to ensure that this deformation of the caliper body caused by the braking action is maintained within acceptable values, which in addition to avoiding damage to the brake system does not create the feeling of a yielding braking system to the driver, whereby causing an extra travel of the lever or the pedal of the brake system and creating a spongy feeling. This necessity urges having extremely rigid structures for the bodies of the caliper and thus to increase the dimensions and weight thereof.

On the other hand, the caliper body being constrained to the vehicle suspension and arranged straddling the disc, is one of the unsprung weights that it is desirable to reduce as much as possible to increase vehicle performance.

Obviously, these considerations are taken to the extreme when the vehicle is of the sporty type and the user desires a braking system which is extremely responsive to commands and at the same time is extremely light so as not to penalize racing vehicle performance.

The need is therefore felt for a disc brake caliper body which has improved structural characteristics, the weight of the caliper body being the same, or has equal structural features, the weight being lower than the solutions of the prior art.

Solutions of caliper bodies designed to increase structural rigidity are known. For example, the aforesaid patent application US2017356513 by FRENI BREMBO SPA and U.S. Pat. No. 4,726,451 by FRENI BREMBO SPA.

Though satisfactory from many points of view, it is still desirable to obtain structures which further maximize the structural rigidity of the caliper body, reducing weight and at the same time able to contain dimensions as much as possible so as to facilitate the assembly of the body of the caliper also inside rims and wheels on which brake discs of large diameter are mounted.

Furthermore, the need is felt to adequately dissipate the heat produced by the friction action applied by the pads which abut against the rotating opposite surfaces of the brake disc during braking actions. In particular, by exploiting the movement of the vehicle, it is desirable to have the caliper body crossed by ventilation air which helps the disposal of the heat transmitted from the pads to the caliper body. Furthermore, it is preferable for the cooling air flow to be in radial direction, allowing the friction material heated by friction produced on braking surfaces to be disposed of directly, crossing the caliper body as little as possible.

For example, in document U.S. Pat. No. 5,535,856 by KELSEY HAYES CO the floating element is radially open and allows the outflow of hot air from the area occupied by the brake pads. This known solution, however, has an elongated annular element which surrounds the bracket, thus being very bulky and heavy.

Other similar solutions are known from U.S. Pat. Nos. 7,234,568, 6,272,914 and 6,131,706 all by FRENI BREMBO SPA.

The need is therefore strongly felt to convey the cooling air in radial direction to the caliper body, preventing at the same time the floating element from being weakened or, on the contrary, made heavier.

SOLUTION

Therefore, it is an object of the present invention to provide a brake disc caliper body and a disc brake caliper having structural and functional characteristics such as to satisfy the aforementioned requirements and to overcome the drawbacks previously mentioned with reference to the discs of the prior art.

These and other objects are achieved by a caliper body of disc brake disc and a caliper of disc brake disc as described and claimed herein.

Some advantageous embodiments are the subject of the dependent claims.

By virtue of the caliper body suggested by the present invention it is possible to achieve high performance while reducing the overall dimensions of the caliper body and at the same time maintaining maximum aeration of the caliper body.

Advantageously, the suggested solution allows high braking performance also for non-extreme sports cars, and also racing cars.

FIGURES

Further features and advantages of the invention will be apparent from the description provided below of preferred embodiments thereof, given by way of non-limiting examples, with reference to the accompanying drawings, in which.

Figure 1:
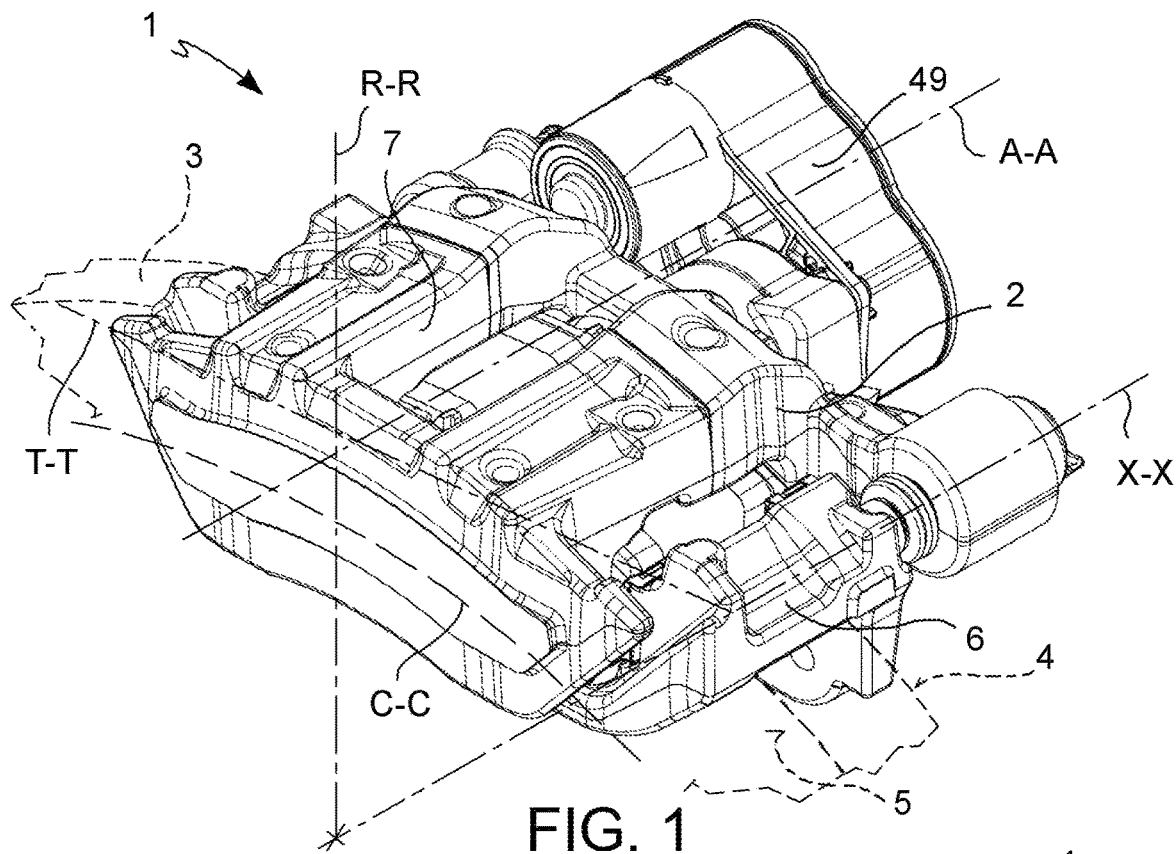
FIG. 1 is a vehicle side axonometric view of a brake caliper according to the invention.
Figure 2:
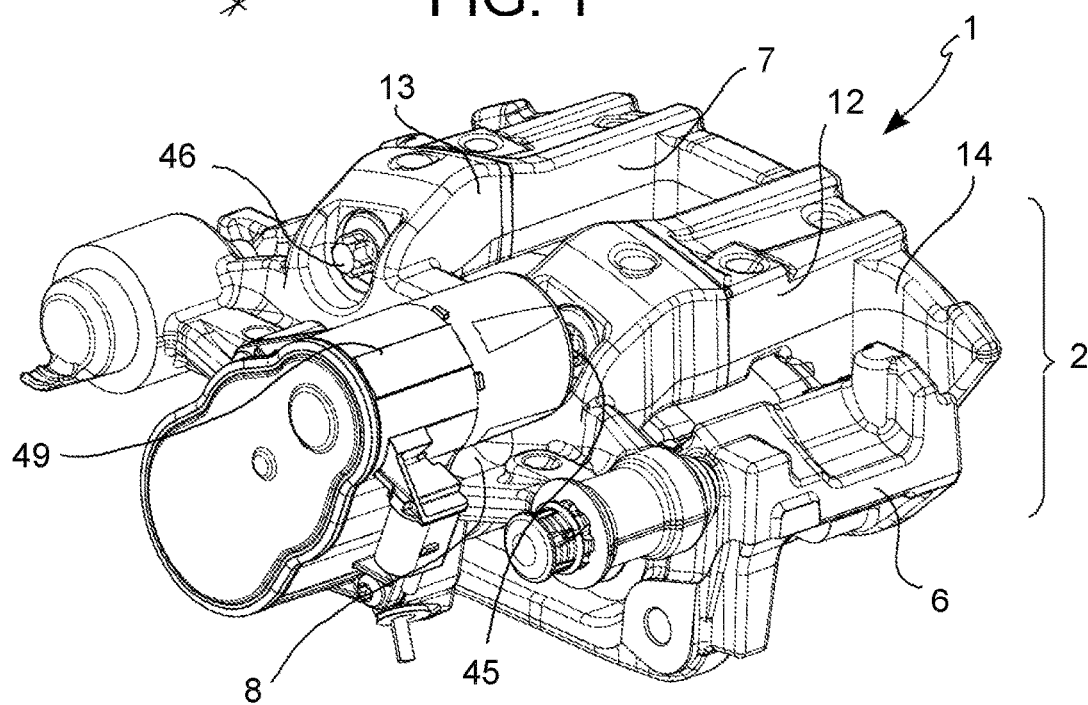
FIG. 2 shows a wheel side axonometric view of the caliper in FIG. 1.
Figure 3:
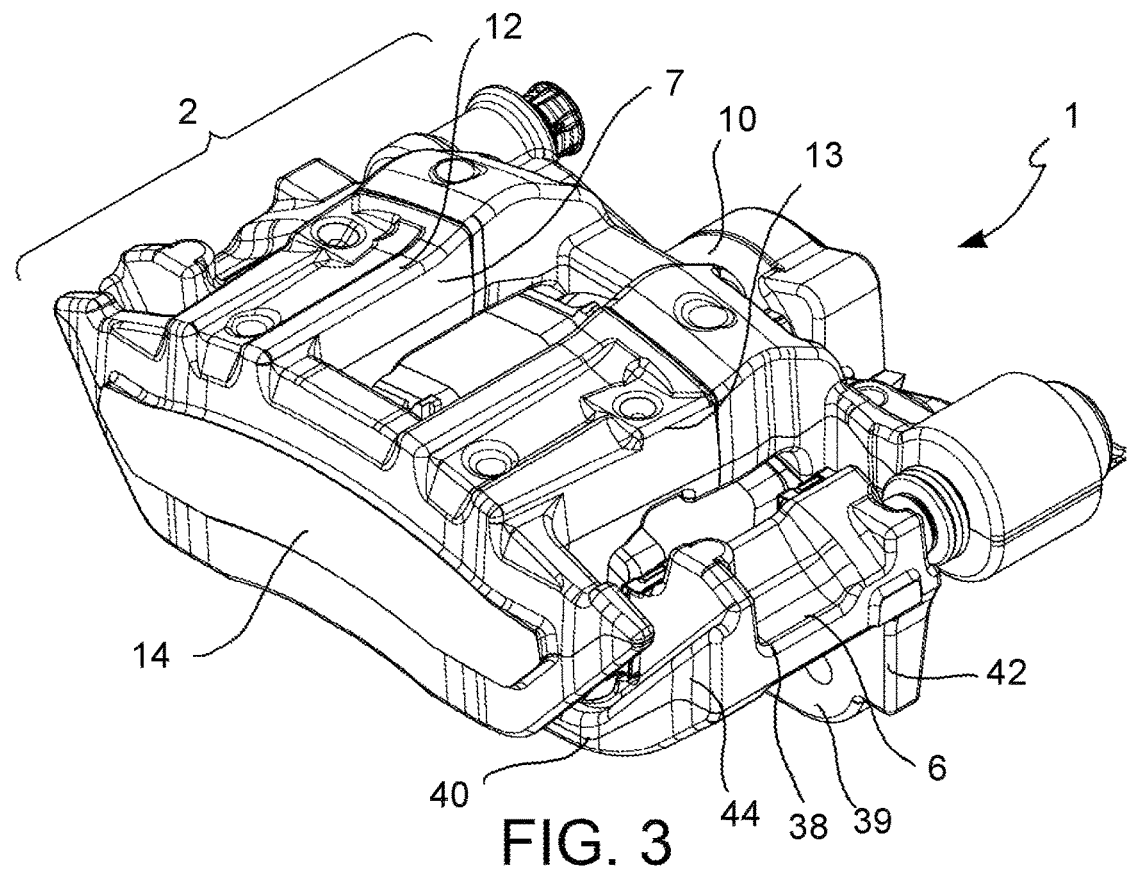
FIG. 3 shows a wheel side axonometric view of a brake caliper provided with a caliper body according to the present invention and free from the actuating actuator of the biasing device of the pads.
Figure 4:
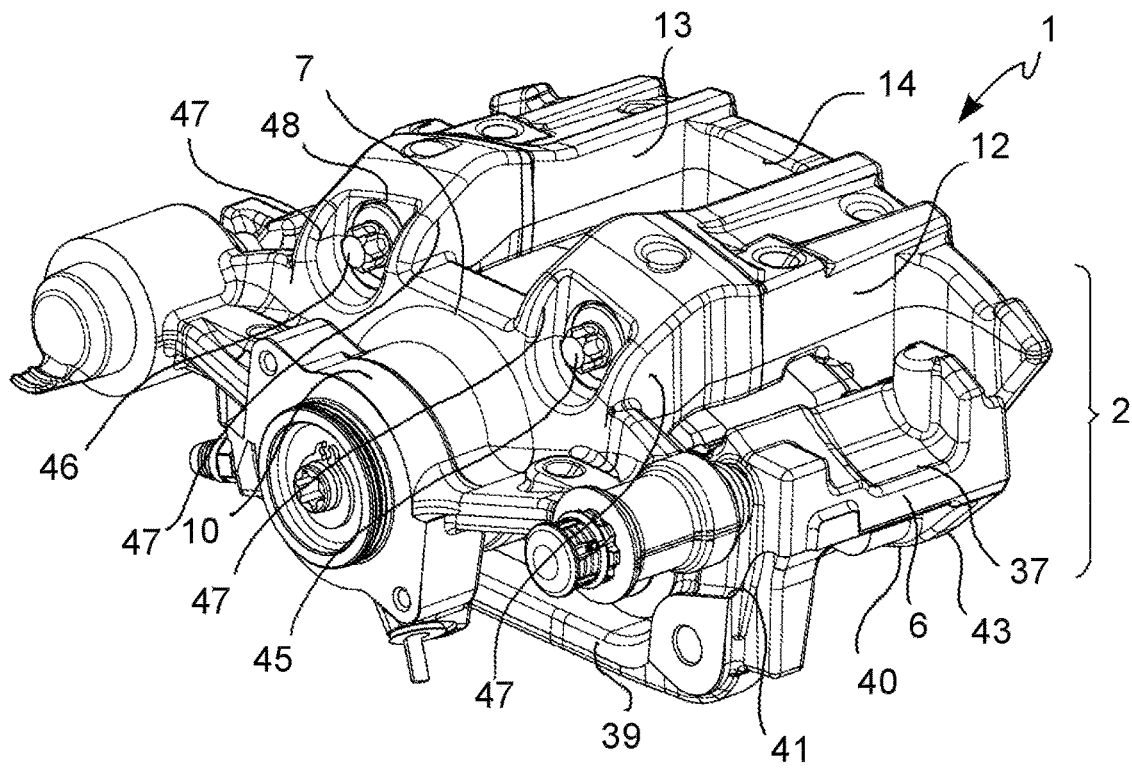
FIG. 4 is a vehicle side axonometric view of the caliper in FIG. 3.
Figure 5:
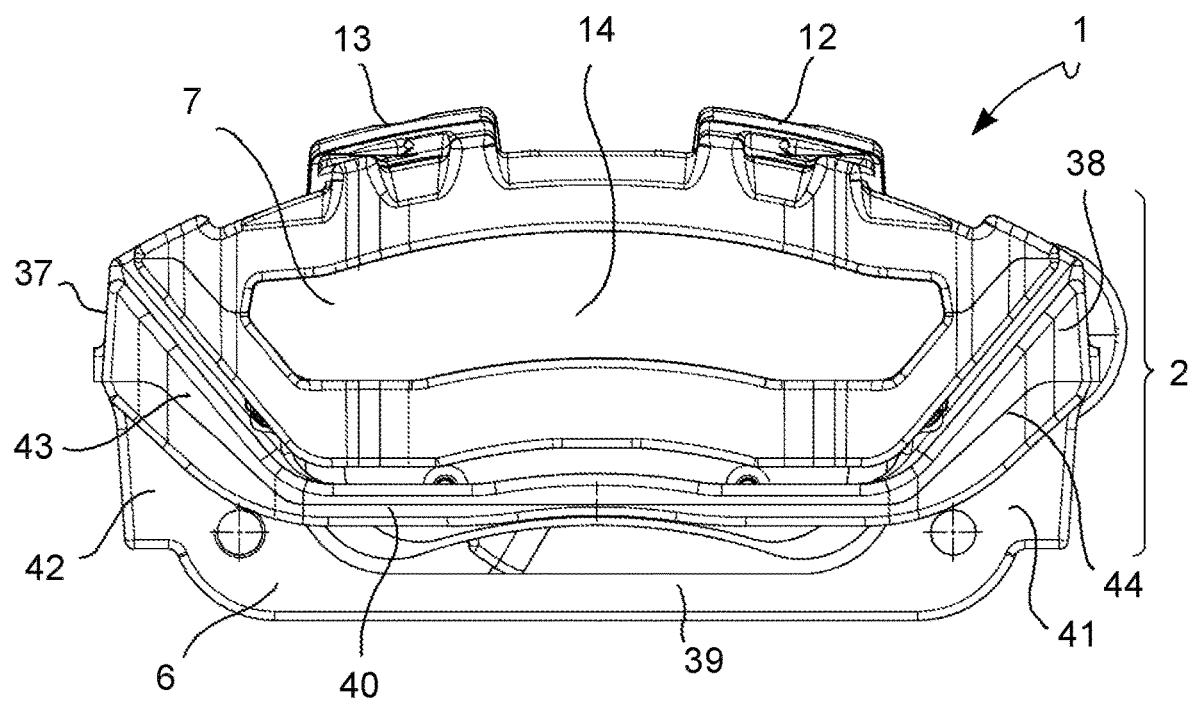
Figure 6:
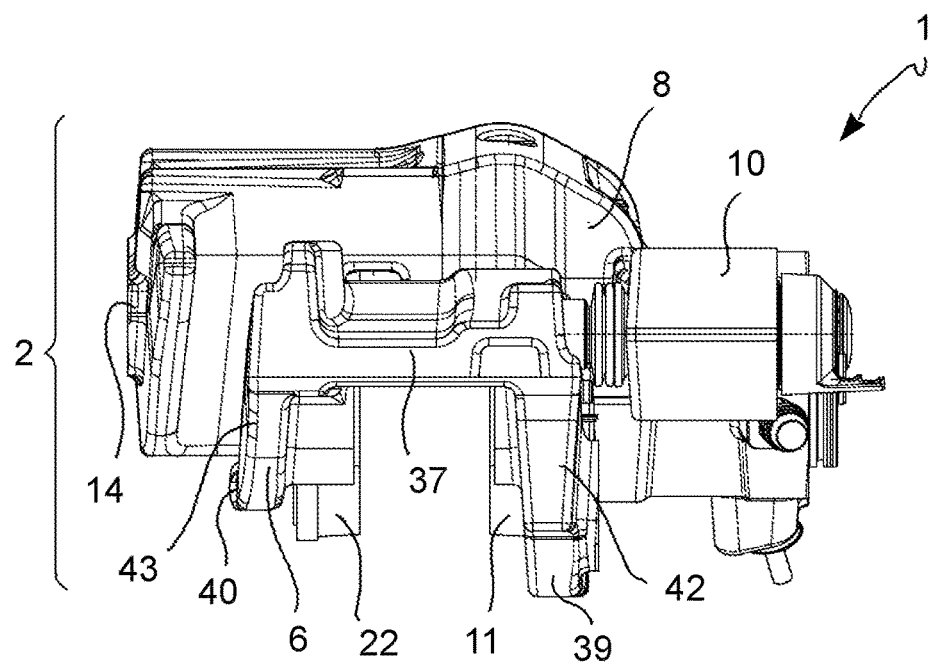
Figure 7:
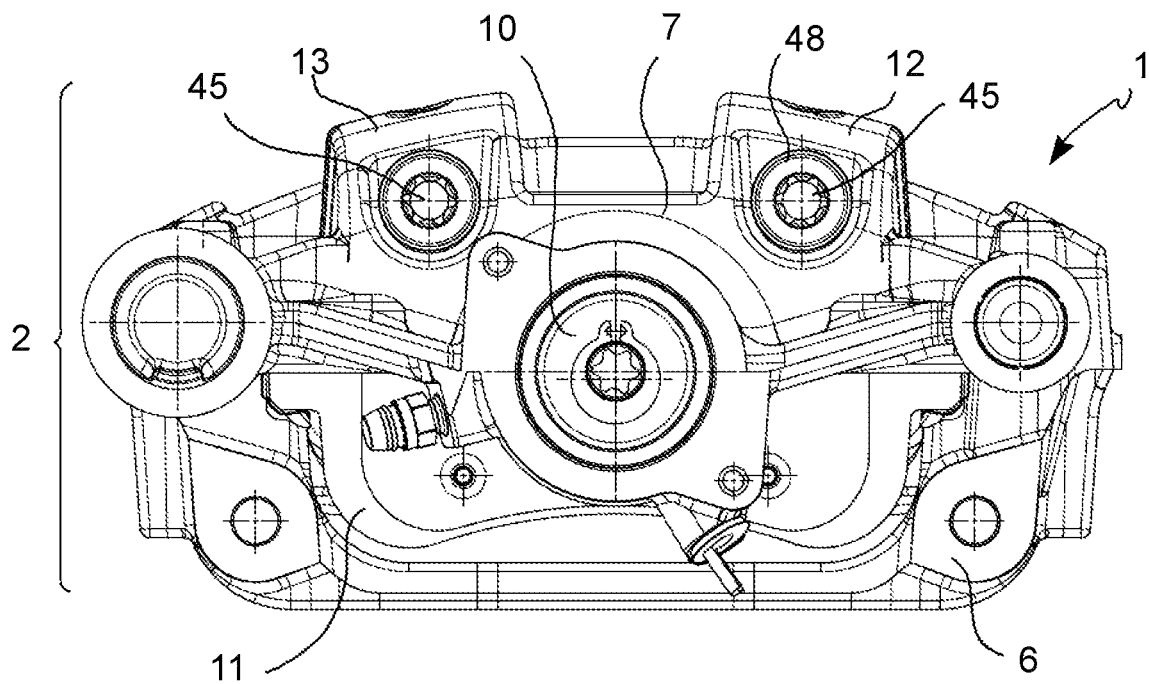
Figure 8:
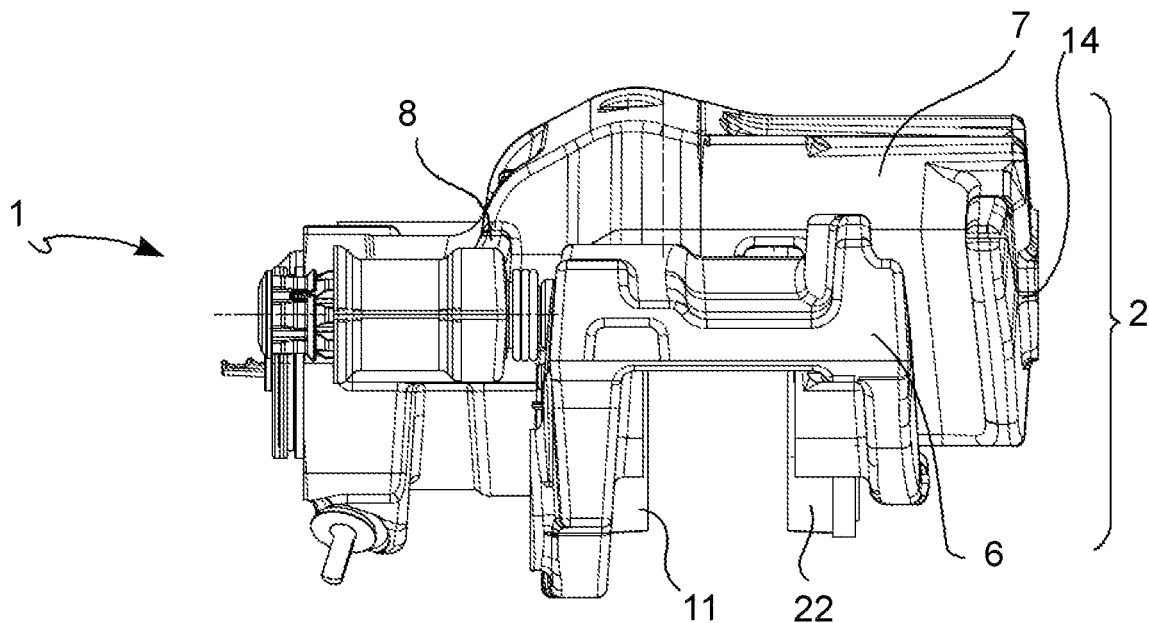
Figure 9:
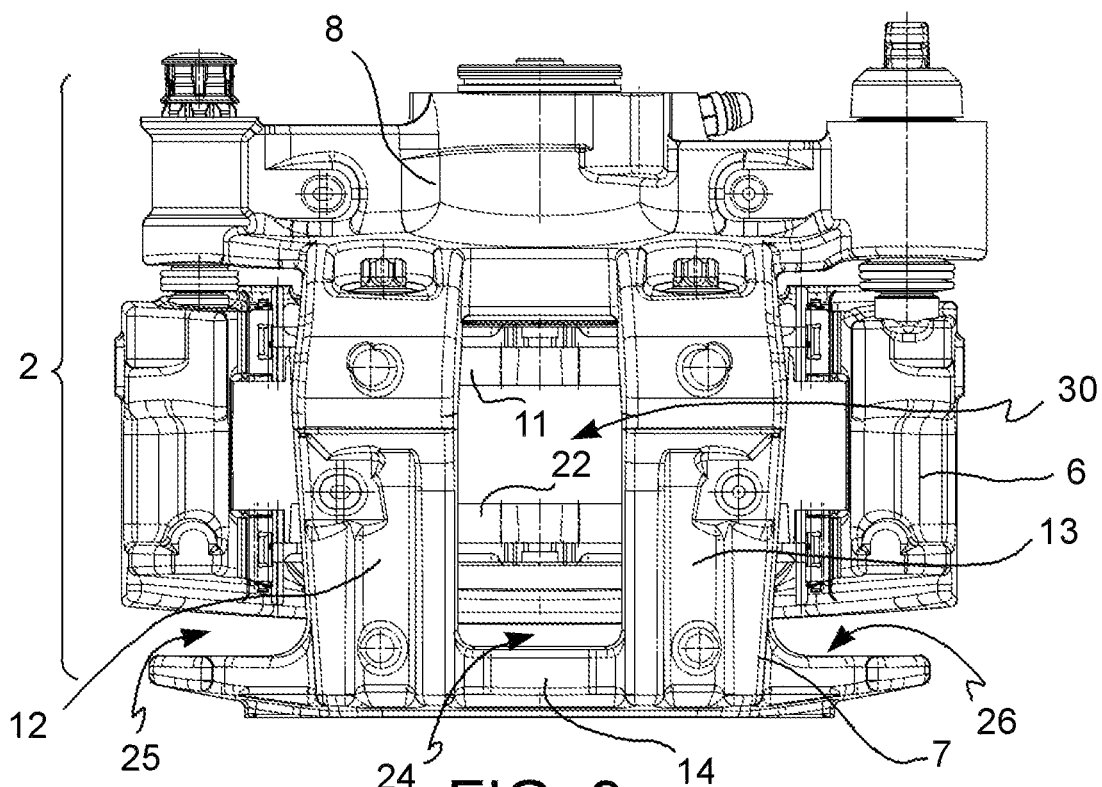
Figure 10:
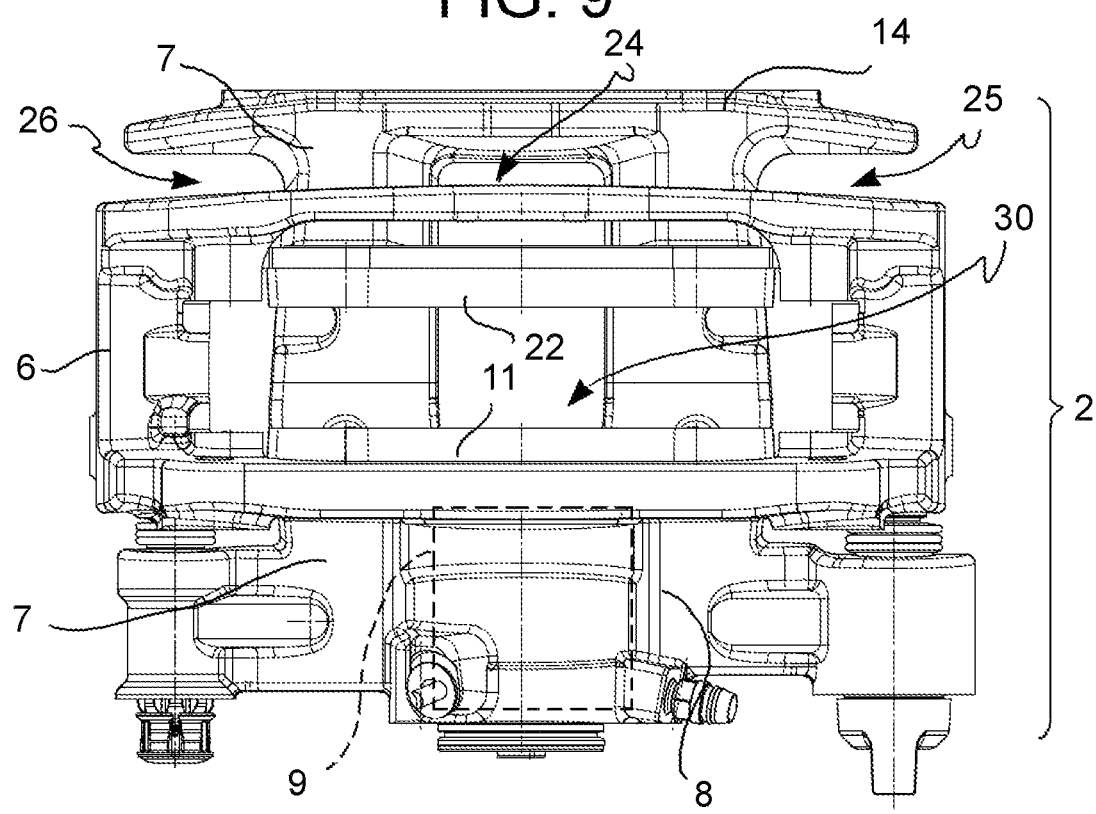
Figure 11:
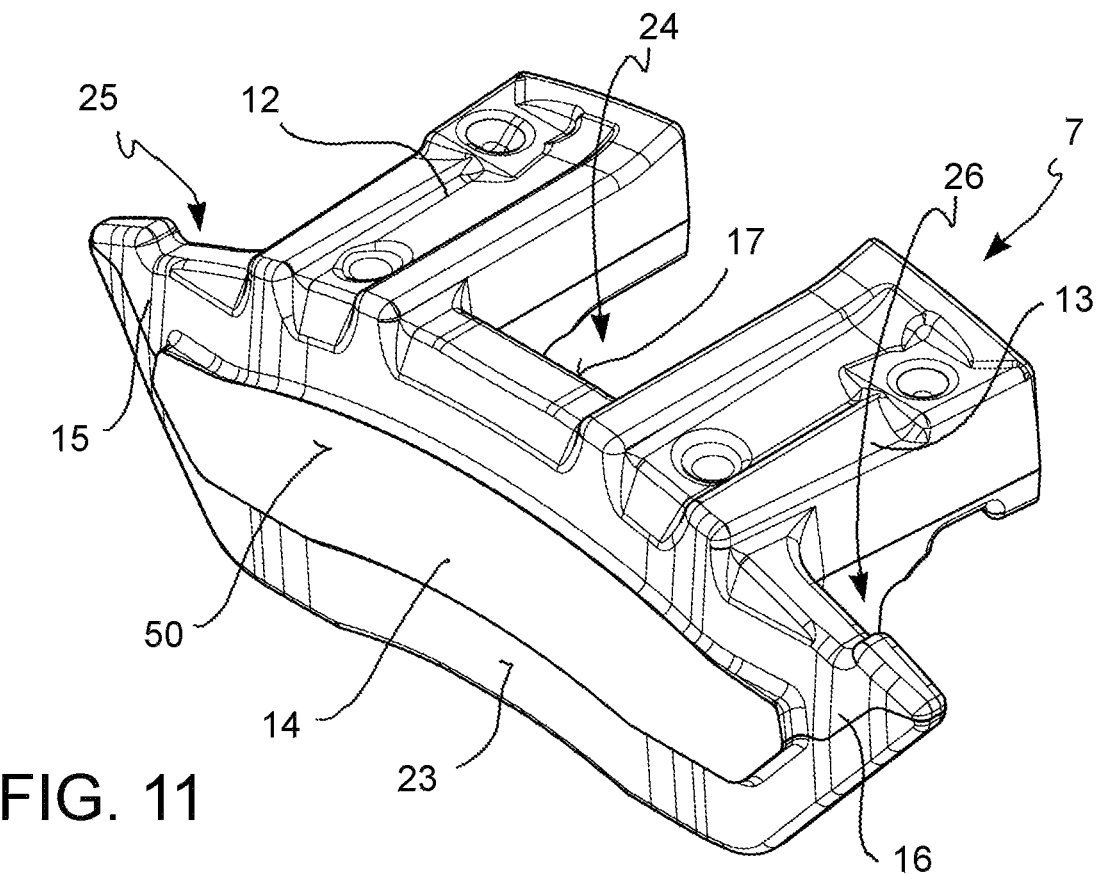
Figure 12:
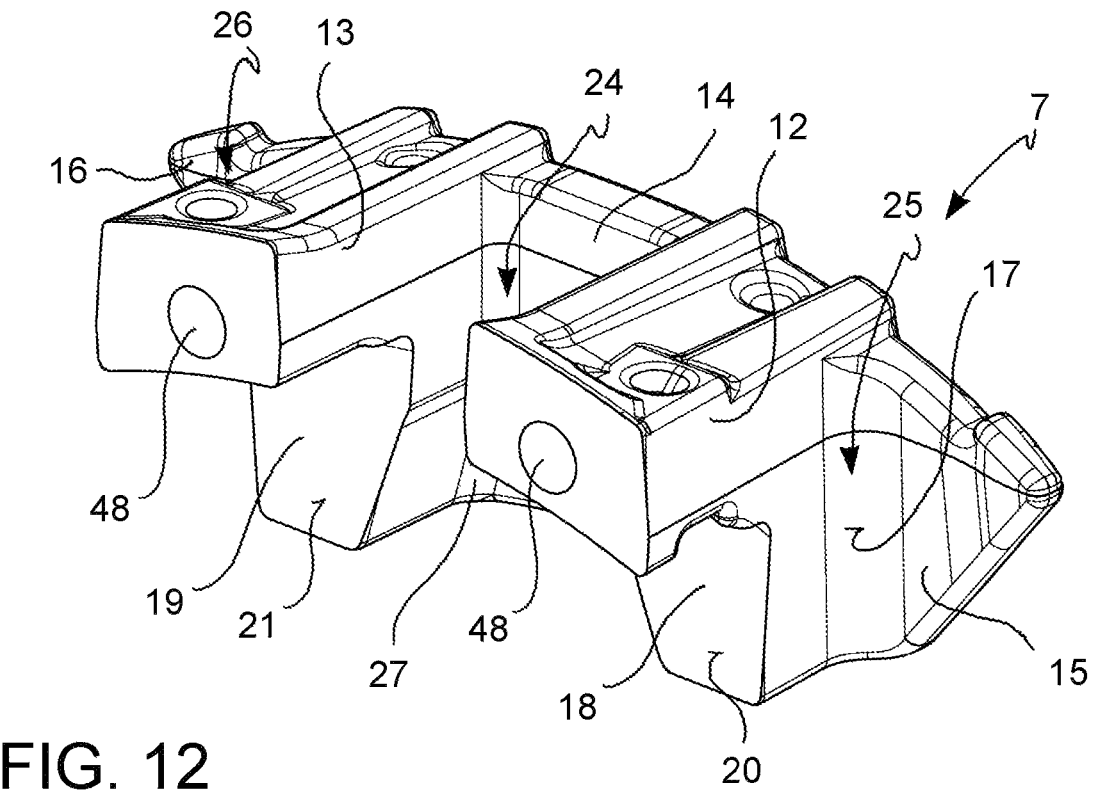
Figure 13:
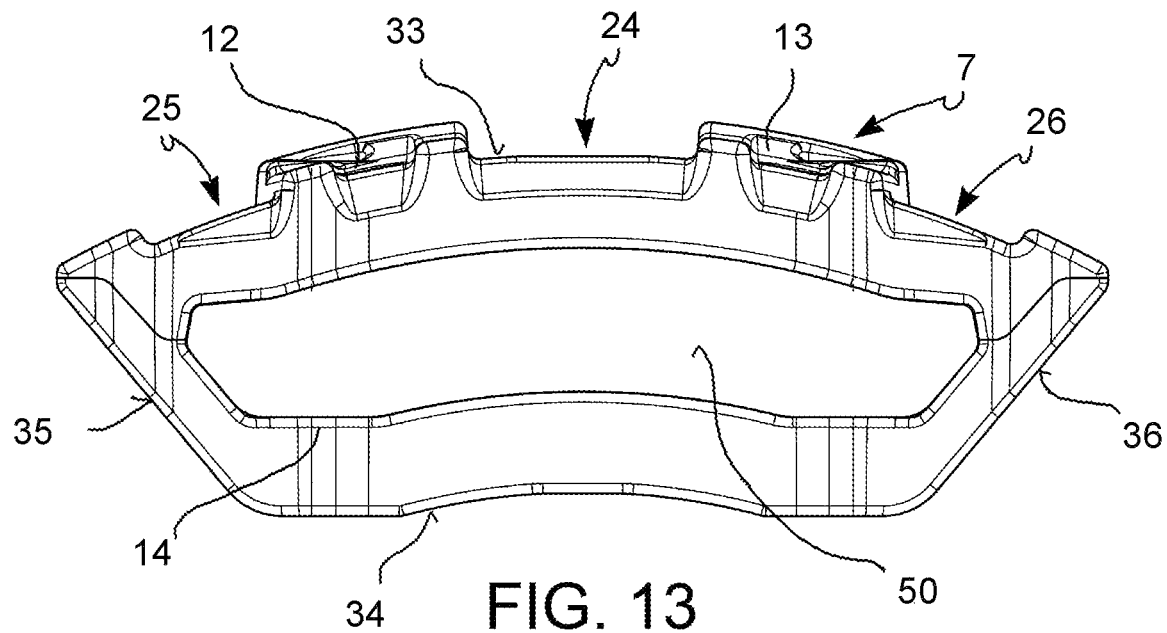
Figure 14:
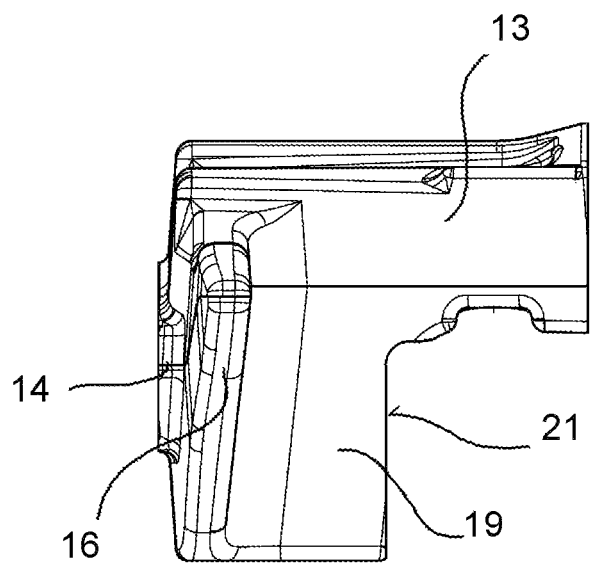
Figure 15:
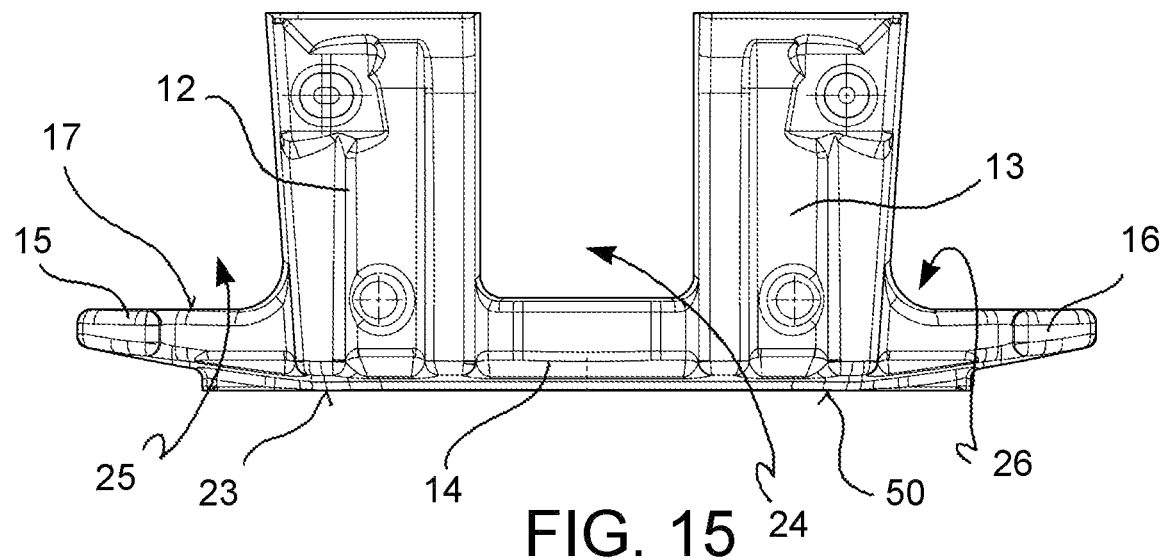
Figure 16:
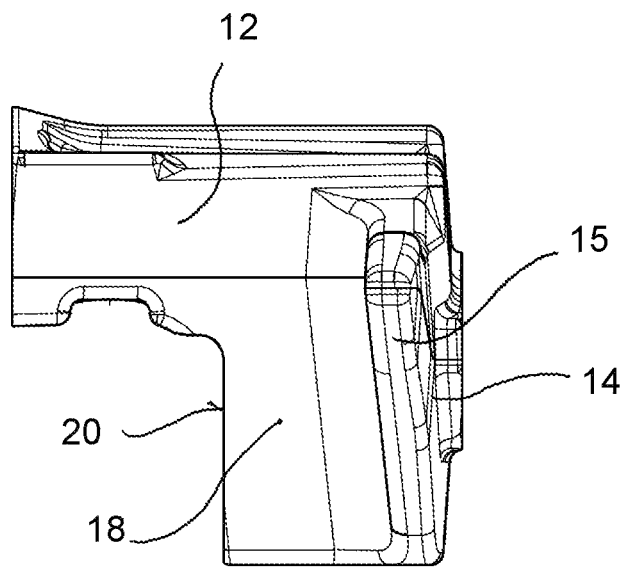
Figure 17:
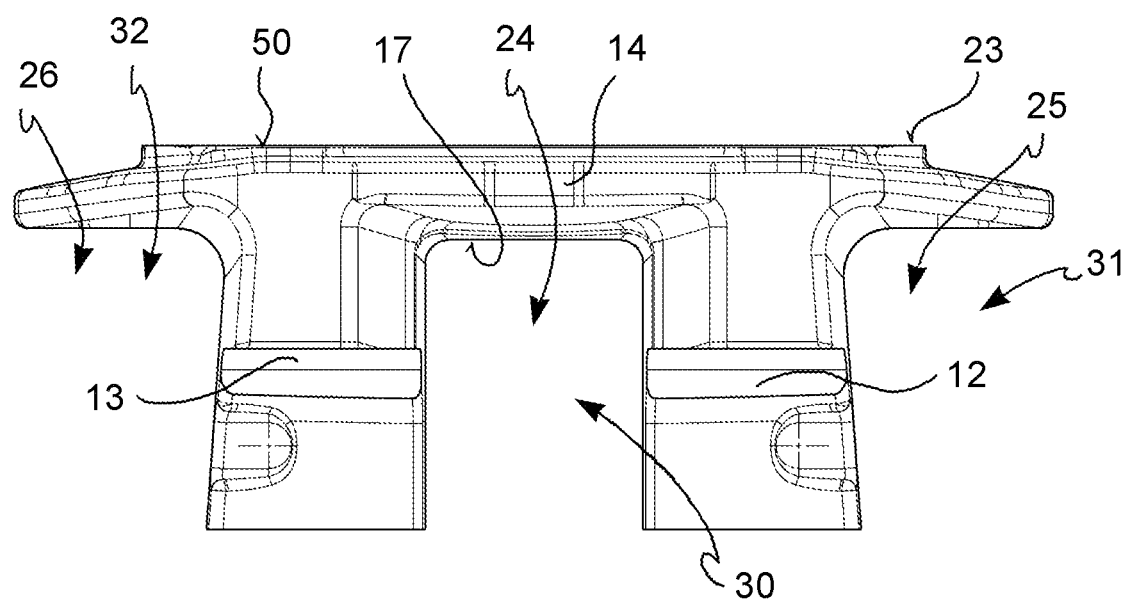
Figure 18:
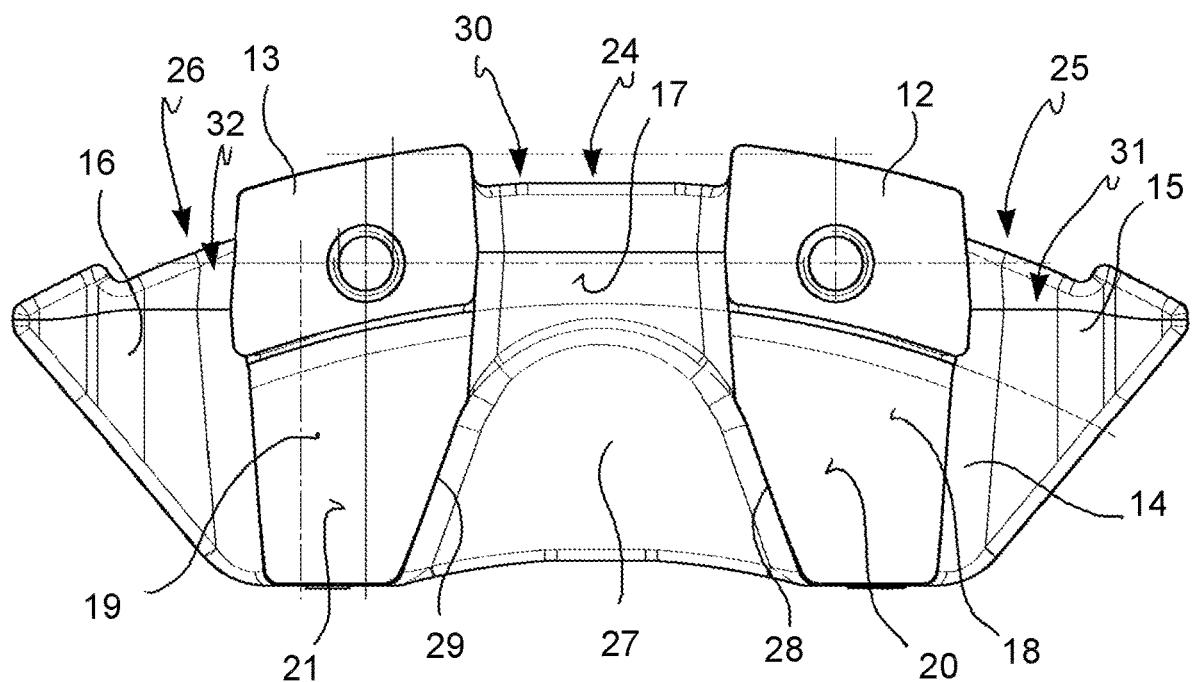

FIGS. from 5 to 10 show the six orthogonal views (frontal, first side, rear, second side, from above and from below) of the brake caliper in FIG. 3;

FIG. 11 shows a wheel side axonometric view of a part of the floating element of the caliper body intended to arranged straddling the disc and reach the braking surface of the disc facing the vehicle wheel;

FIG. 12 is a vehicle side axonometric view of the floating element in FIG. 11;

FIGS. from 13 to 18 show the six orthogonal views (frontal, first side, rear, second side, from above and from below) of the part of the floating element of the brake caliper.

DESCRIPTION OF SOME PREFERRED EXAMPLE EMBODIMENTS

According to a general embodiment, a caliper body 1 of disc brake caliper 2 of the floating type is provided.

Said caliper body 1 is adapted to be arranged straddling a brake disc 3 having first and second opposite braking surfaces 4, 5 adapted to rotate about a rotation axis X-X which defines an axial direction A-A, radial directions R-R orthogonal to said axial direction A-A and passing through said rotation axis X-X, as well as a circumferential direction C-C orthogonal to each of said radial directions R-R and to said axial direction A-A, as well as specifically a tangential direction T-T orthogonal to the axial A-A and radial R-R directions passing through said point.

Said caliper body 1 comprises a bracket 6 adapted to connect to a caliper support provided in a vehicle.

Said caliper body 1 comprises a floating element 7 slidingly supported by said bracket 6 so as to move relative to the bracket 6 along said axial direction A-A.

Said floating element 7 comprises a first floating element portion 8 adapted to face said first braking surface 4 either directly or indirectly.

Said first floating element portion 8 comprises at least one biasing device housing 9 adapted to accommodate a biasing device capable of applying a biasing force to a first brake pad 11 facing said first braking surface 4 to apply a braking action on said brake disc 3.

Said floating element 7 comprises at least a first floating element bridge 12; 13 supported by said first floating element portion 8 and which protrudes straddling said brake disc 3.

Said floating element 7 comprises a plate-shaped portion 14 overhangingly supported by said at least a first floating element bridge 12;13 which extends with a first outer plate-shaped portion side 23 thereof, arranged opposite to said biasing device 10, substantially on a plane extending along circumferential C-C and radial R-R directions.

Advantageously, said plate portion 14 comprises plate-shaped portion end portions 15, 16 which overhangingly protrude from opposite sides and in circumferential direction C-C with respect to said at least a first floating element bridge 12; 13.

Said plate-shaped portion 14 comprises a second inner plate-shape portion side 17 facing said biasing device 10 and opposite said first outer plate-shaped portion side 23.

Said plate-shaped portion 14 comprises at least two plate-shaped portion projections 18, 19 which overhangingly protrude from said plate-shaped portion side 17.

Said at least two plate-shaped portion projections 18, 19 comprise thrust surfaces 20, 21 adapted to bias a second pad 22 against said second braking surface 5;

Said at least two plate-shaped portion projections 18, 19, mutually and with said plate-shaped portion 14, form a plate-shaped portion ventilation channel 24 mainly extending in radial direction R-R.

According to an embodiment, said at least two plate-shaped portion projections 18, 19 form opposite side ventilation channels 25, 26 mutually and externally, i.e. along a circumferential direction C-C and away from said at least two plate-shaped portion projections 18, 19, and with said two opposite plate-shaped portion end portions 15, 16.

According to an embodiment, said plate-shaped portion 14 substantially and completely covers said second pad 22 in axial direction A-A.

According to an embodiment, said plate-shaped portion ventilation channel 24 comprises an enlarged channel portion 27 with enlarged portion side walls 28, 29 mutually diverging away from said at least one first floating element bridge 12; 13.

According to an embodiment, said floating element 7 comprises at least a first and a second floating element bridge 12; supported by said first floating element portion 8 and which protrude straddling said brake disc 3;

According to an embodiment, said first and second floating element bridges 12, 13 are joined to said at least two plate-shaped portion projections 18, 19;

According to an embodiment, said first and second floating element bridges 12, 13 mutually form a central radial window 30;

According to an embodiment, said central radial window 30 allows said plate-shaped portion ventilation channel 24 to open outside the caliper body 1.

According to an embodiment, said at least a first floating element bridge 12; 13 and said plate-shaped portion 14 form two opposite end openings 31, 32.

According to an embodiment, said two opposite end openings 31, 32 allows said two opposite side ventilation channels 25, 26 to open outside the caliper body 1.

According to an embodiment, said plate-shaped portion 14 comprises an upper plate-shaped portion edge 33, a lower plate-shaped portion edge 34 and opposite lateral plate-shaped portion edges 35, 36, wherein said upper plate-shaped portion edge 33 is arched in shape with the concavity facing the lower plate-shaped portion edge 34; and wherein said lateral plate-shaped portion edges 35, 36 have at least one rectilinear edge portion and mutually converge passing from said upper plate-shaped portion edge 33 to said lower plate-shaped portion edge 34.

According to an embodiment, said floating element 7 is made in two parts which are mutually connected by means of at least one stud bolt 45; 46;

According to an embodiment, said at least one first floating element bridge 12 comprises two parallel ribs 47 which joined it to said first floating element portion 8 mutually forming a connecting element housing 48 adapted to accommodate said stud bolt 45; 46.

According to an embodiment, said first outer plate-shaped portion side 23 comprises an outer flat surface 50 adapted to affix indications.

According to an embodiment, said bracket 6 is shaped as a cradle which at least partially accommodates said first and said second brake pads 11, 22;

According to an embodiment, said bracket 6 comprises two bracket bridges 37, 38, substantially directed axially A-A, mutually connected by two bracket crosspieces 39, 40, directed substantially circumferentially C-C, by means of bracket uprights 41, 42, 43, 44 directed substantially radially R-R.

The present invention further relates to a brake caliper comprising at least one caliper body according to any one of the embodiments described above.

According to an embodiment, the caliper brake comprises a ratio motor 49 operatively connected to said biasing device 10.

The present invention also relates to a disc brake comprising said caliper.

Those skilled in the art may make many changes and adaptations to the embodiments described above or may replace elements with others which are functionally equivalent in order to meet contingent needs without however departing from the scope of the appended claims.

LIST OF REFERENCES 1 caliper body
2 disc brake caliper
3 brake disc
4 first braking surface
5 second opposite braking surface
6 bracket
7 floating element
8 first portion of floating element
9 biasing device housing
10 biasing device
11 first brake pad
12 first floating element bridge
13 second floating element bridge
14 plate-shaped portion
15 plate-shaped portion end portion
16 plate-shaped portion end portion
17 second inner plate-shaped portion side
18 plate-shaped projection
19 plate-shaped projection
20 thrust surface
21 thrust surface
22 second brake pad
23 first outer plate-shaped portion side
24 plate-shaped ventilation channel
25 side ventilation channel
26 side ventilation channel
27 enlarged channel portion
28 enlarged portion side walls
29 enlarged portion side walls
30 central radial window
31 opposite end openings
32 opposite end openings
33 upper plate-shaped portion edge
34 lower plate-shaped portion edge
35 lateral plate-shaped portion edge
36 lateral plate-shaped portion edge
37 bracket bridge
38 bracket bridge
39 bracket crosspiece
X-X rotation axis
40 bracket crosspiece
41 bracket upright
42 bracket upright
43 bracket upright
44 bracket upright
45 stud bolt connecting two parts of the floating element
46 stud bolt connecting two parts of the floating element
47 parallel ribs
48 connecting element seat
49 ratio motor
50 outer flat surface
A-A axial direction parallel to X-X
R-R radial direction orthogonal to A-A
T-T tangential direction punctually orthogonal to A-A and R-R
C-C circumferential direction orthogonal to axial direction A-A and radial direction R-R

The invention claimed is:

1. A caliper body of a disc brake caliper of the floating type, wherein said caliper body is adapted to be arranged straddling a brake disc having first and second opposite braking surfaces adapted to rotate about a rotation axis (X-X) defining an axial direction (A-A), radial directions (R-R) orthogonal to said axial direction (A-A) and passing through said rotation axis (X-X), a circumferential direction (C-C) orthogonal to each of said radial directions (R-R) and to said axial direction (A-A), and, in a specific point, a tangential direction (T-T) orthogonal to the axial (A-A) and radial (R-R) directions passing through said specific point, wherein:

said caliper body comprises a bracket adapted to connect to a caliper support provided in a vehicle;

said caliper body comprises a floating element slidingly supported by said bracket so as to move relative to the bracket along said axial direction (A-A);

said floating element comprises a first floating element portion adapted to face said first braking surface either directly or indirectly;

said first floating element portion comprises at least one biasing device housing adapted to accommodate a biasing device capable of applying a biasing force to a first brake pad facing said first braking surface to apply a braking action on said brake disc;

said floating element comprises at least one first floating element bridge supported by said first floating element portion and protruding straddling said brake disc;

said floating element comprises a plate-shaped portion overhangingly supported by said at least one first floating element bridge which extends with a first outer plate-shaped portion side thereof, arranged opposite to said biasing device, on a plane extending along circumferential (C-C) and radial (R-R) directions; wherein said plate-shaped portion comprises plate-shaped portion end portions overhangingly protruding from opposite sides and in circumferential direction (C-C) with respect to said at least one first floating element bridge;

said plate-shaped portion comprises a second inner plate-shaped portion side facing said biasing device and opposite said first outer plate-shaped portion side;

said plate-shaped portion comprises at least two plate-shaped portion projections overhangingly protruding from said second inner plate-shaped portion side;

said at least two plate-shaped portion projections comprise thrust surfaces adapted to bias a second brake pad against said second braking surface;

said at least two plate-shaped portion projections, mutually, and with said plate-shaped portion, form a plate-shaped portion ventilation channel mainly extending in radial direction (R-R), wherein said plate-shaped portion comprises a plate-shaped inner surface configured to axially face the second brake pad, said plate-shaped inner surface continuously extends the height of the channel in the radial direction (R-R) between the at least two plate-shaped portion projections.

2. The caliper body of claim 1, wherein said at least two plate-shaped portion projections form opposite side ventilation channels mutually and externally, along a circumferential direction (C-C) and away from said at least two plate-shaped portion projections, with said two opposite plate-shaped portion end portions.

3. The caliper body of claim 1, wherein said plate-shaped portion substantially covers said second brake pad in axial direction (A-A).

4. The caliper body of claim 1, wherein: said plate-shaped portion ventilation channel comprises an enlarged channel portion with enlarged portion side walls mutually diverging away from said at least one first floating element bridge.

5. The caliper body of claim 1, wherein said floating element comprises a first and a second floating element bridges supported by said first floating element portion and protruding straddling said brake disc.

6. The caliper body of claim 5, wherein said first and second floating element bridges are joined to said at least two plate-shaped portion projections.

7. The caliper body of claim 5, wherein said first and second floating element bridges mutually form a central radial window.

8. The caliper body of claim 7, wherein said central radial window allows said plate-shaped portion ventilation channel to open outside the caliper body.

9. The caliper body of claim 1, wherein said at least one first floating element bridge and said plate-shaped portion form two opposite end openings.

10. The caliper body of claim 9, wherein said two opposite end openings allow said opposite side ventilation channels to open outside the caliper body.

11. The caliper body of claim 1, wherein:

said plate-shaped portion comprises an upper plate-shaped portion edge, a lower plate-shaped portion edge and opposite lateral plate-shaped portion edges, said upper plate-shaped portion edge is arched in shape with a concavity facing the lower plate-shaped portion edge; and said lateral plate-shaped portion edges have at least one rectilinear edge portion and mutually converge passing from said upper plate-shaped portion edge to said lower plate-shaped portion edge.

12. The caliper body of claim 1, wherein:

said floating element is made in two parts mutually connected by at least one stud bolt;

and/or wherein said at least one first floating element bridge comprises two parallel ribs joining said at least one first floating element bridge to said first floating element portion mutually forming a connecting element housing adapted to accommodate said at least one stud bolt.

13. The caliper body of claim 1, wherein said first outer plate-shaped portion side comprises an outer flat surface adapted to affix indications.

14. The caliper body of claim 1, wherein said bracket is shaped as a cradle at least partially accommodating said first and said second brake pads.

15. The caliper body of claim 1, wherein said bracket comprises two bracket bridges, substantially directed axially (A-A), mutually connected by two bracket crosspieces, directed substantially circumferentially (C-C), by means of bracket uprights directed substantially radially (R-R).

16. A brake caliper comprising a caliper body adapted to be arranged straddling a brake disc having first and second opposite braking surfaces adapted to rotate about a rotation axis (X-X) defining an axial direction (A-A), radial directions (R-R) orthogonal to said axial direction (A-A) and passing through said rotation axis (X-X), a circumferential direction (C-C) orthogonal to each of said radial directions (R-R) and to said axial direction (A-A), and, in a specific point, a tangential direction (T-T) orthogonal to the axial (A-A) and radial (R-R) directions passing through said specific point, wherein said caliper body comprises a bracket adapted to connect to a caliper support provided in a vehicle;

said caliper body comprises a floating element slidingly supported by said bracket so as to move relative to the bracket along said axial direction (A-A);

said floating element comprises a first floating element portion adapted to face said first braking surface either directly or indirectly;

said floating element comprises at least one first floating element bridge supported by said first floating element portion and protruding straddling said brake disc;

said floating element comprises a plate-shaped portion overhangingly supported by said at least one first floating element bridge which extends with a first outer plate-shaped portion side thereof, arranged opposite to said biasing device, on a plane extending along circumferential (C-C) and radial (R-R) directions;
wherein
said plate-shaped portion comprises plate-shaped portion end portions overhangingly protruding from opposite sides and in circumferential direction (C-C) with respect to said at least one first floating element bridge;
said plate-shaped portion comprises a second inner plate-shaped portion side opposite said first outer plate-shaped portion side;
said plate-shaped portion comprises at least two plate-shaped portion projections overhangingly protruding from said second inner plate-shaped portion side;
said at least two plate-shaped portion projections, mutually, and with said plate-shaped portion, form a plate-shaped portion ventilation channel mainly extending in radial direction (R-R);
wherein said plate-shaped portion comprises a plate-shaped inner surface continuously extending the height of the channel in the radial direction (R-R) between the at least two plate-shaped portion projections.

17. The brake caliper of claim 16, wherein said caliper comprises a ratio motor operatively connected to said biasing device.

* * * * *